United States Patent
Garg et al.

(10) Patent No.: US 7,146,353 B2
(45) Date of Patent: Dec. 5, 2006

(54) RESOURCE ALLOCATION FOR MULTIPLE APPLICATIONS

(75) Inventors: Pankaj K. Garg, Sunnyvale, CA (US); Cipriano A. Santos, Modesto, CA (US); Hsiu-Khuern Tang, Menlo Park, CA (US); Alex Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 530 days.

(21) Appl. No.: 10/624,318

(22) Filed: Jul. 22, 2003

(65) Prior Publication Data

US 2005/0021530 A1    Jan. 27, 2005

(51) Int. Cl.
*G06F 7/00* (2006.01)

(52) U.S. Cl. .................... 707/2; 709/105; 709/100; 709/2; 709/226; 705/27; 713/100

(58) Field of Classification Search ................ 709/100, 709/105, 221, 226, 217, 224; 705/27; 713/100
See application file for complete search history.

(56) References Cited

U.S. PATENT DOCUMENTS

| | | | | |
|---|---|---|---|---|
| 5,956,489 A | * | 9/1999 | San Andres et al. | 709/221 |
| 6,625,643 B1 | * | 9/2003 | Colby et al. | 709/217 |
| 2002/0065864 A1 | * | 5/2002 | Hartsell et al. | 709/100 |
| 2002/0120744 A1 | * | 8/2002 | Chellis et al. | 709/226 |
| 2002/0194251 A1 | * | 12/2002 | Richter et al. | 709/105 |
| 2003/0046396 A1 | * | 3/2003 | Richter et al. | 709/226 |
| 2004/0117476 A1 | * | 6/2004 | Steele et al. | 709/224 |
| 2004/0153376 A1 | * | 8/2004 | Ganesan et al. | 705/27 |
| 2004/0177245 A1 | * | 9/2004 | Murphy | 713/100 |

* cited by examiner

*Primary Examiner*—Khanh B. Pham
*Assistant Examiner*—Emeka Ebirim

(57) ABSTRACT

Method and apparatus for allocating resources to a plurality of applications. In various embodiments instrumentation data may be gathered for work requests processed by the applications. An associated workload level may be determined for work requests processed by the applications. For each application an application resource requirement may be determined as a function of the workload levels and a service level metric associated with the application. For each application an assigned subset of resources may be determined as a function of the application resource requirement, a minimization of communication delays between resources, and a bandwidth capacity requirement of the application. The resources may be automatically reconfigured consistent with the assigned subset of resources for each application.

21 Claims, 6 Drawing Sheets

RESOURCE ALLOCATION FOR MULTIPLE APPLICATIONS

FIELD OF THE INVENTION

The present disclosure generally relates to the allocation of resources to various applications.

BACKGROUND

Large data centers are often used to provide computing services to a number of organizations who may have varied computing requirements. A data center generally includes a collection of server-class data processing systems ("servers") that are configured and networked to accommodate various application needs. Service Level Agreements (SLAs) define the level of computing capacity that the data center is expected to provide to an application. The SLA may address storage requirements, transaction throughput, availability and many other variables.

A data center allows multiple applications to be hosted on a collection of shared computing resources based on the resource needs of the applications. The resources may be configured for sharing while protecting each resource domain against unauthorized access from another domain. The resources may be configured based on applications' resource needs and the architecture of each application. For example, a common architecture for a web service system is a tiered structure including a first tier of web servers, a second tier of application servers, and a third tier of database servers. Within each tier multiple machines may be provisioned to share the incoming workload.

The success of a data center may be judged not only by the level of service provided to the customer organizations, but also by the level of efficiency with which the data center is able to meet customer demands. It may be desirable for a data center to assemble the amount of resources required by the SLAs, plus some reserve capacity to allow for temporary needs for additional resources or to allow for some small amount of growth. However, the amount of resources required by a customer for some periods of time may be less than the amount specified in the SLA, which may imply that the data center has idle resources for these periods. A data center having too many idle resources may be unprofitable or unable to compete with other data centers with respect to cost of services. The present invention may address various issues related to effectively managing the resources of a data center.

SUMMARY

The disclosure describes various methods and apparatus for allocating resources to a plurality of applications. In various embodiments instrumentation data may be gathered for work requests processed by the applications. An associated workload level may be determined for work requests processed by the applications. For each application an application resource requirement may be determined as a function of the workload levels and a service level metric associated with the application. For each application an assigned subset of resources may be determined as a function of the application resource requirement, a minimization of communication delays between resources, and a bandwidth capacity requirement of the application. The resources may be automatically reconfigured consistent with the assigned subset of resources for each application.

It will be appreciated that various other embodiments are set forth in the Detailed Description and claims which follow.

DETAILED DESCRIPTION

Figure 1:
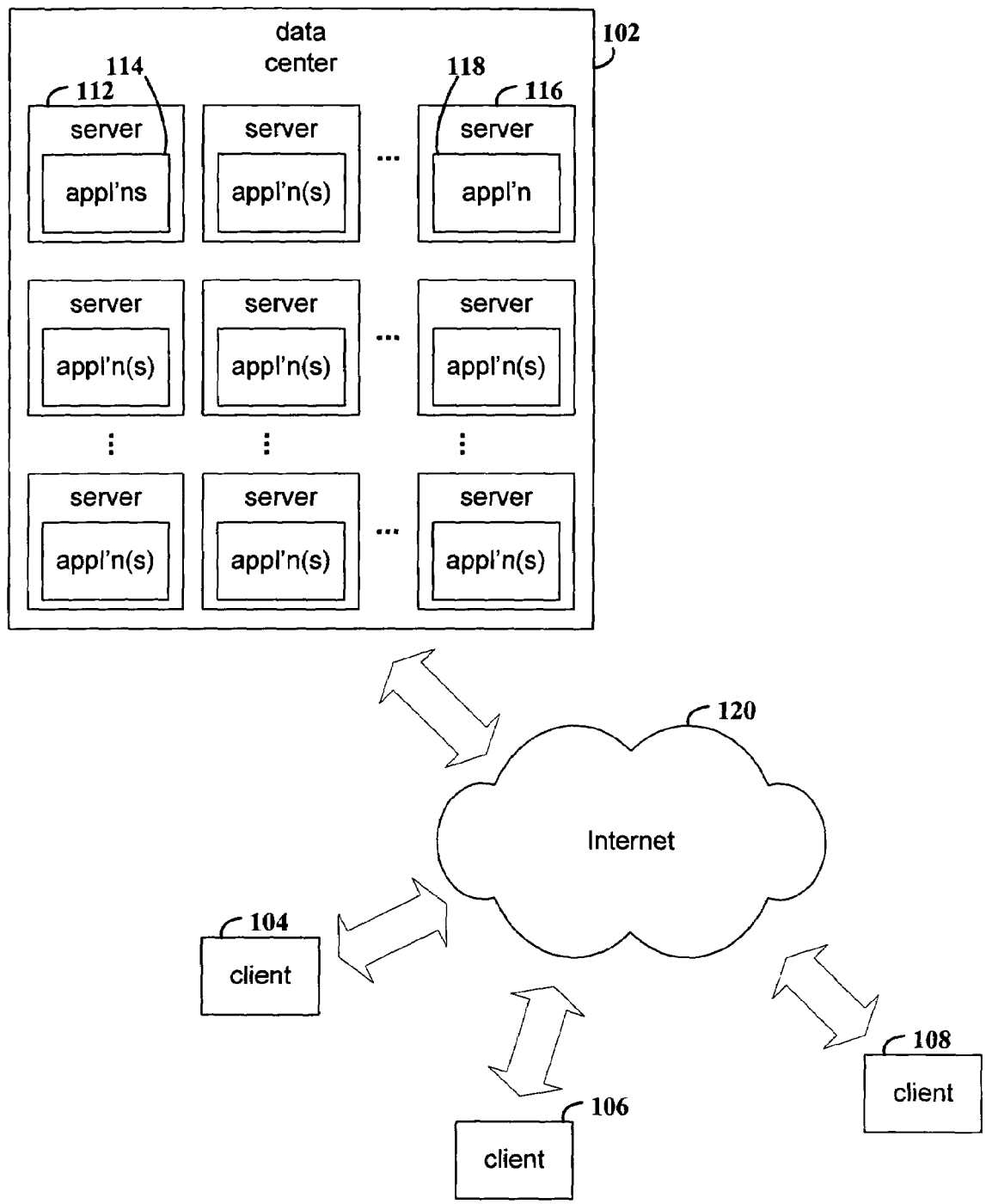
FIG. 1 is a functional block diagram that illustrates at a high level the resources of a data center in relation to clients that access applications hosted by the data center.

FIG. 1 is a functional block diagram that illustrates at a high level the resources of a data center 102 in relation to clients 104, 106, and 108 that access applications hosted by the data center. A data center may have thousands of servers that are distributed in different geographical regions and that collectively run hundreds of different applications, even though data center 102 is illustrated as a block with a collection of servers.

The servers of a data center may provide computational, storage, communications, or other basic services depending on application needs and data center priorities. Servers may be shared or dedicated to applications depending on resource requirements. For example, server 112 may be shared by multiple applications 114, while server 116 may be dedicated to a single application 118.

Clients access the applications via a network such as the Internet 120. Certain clients may have access to selected applications depending on application requirements. A client may be a web browser responding to user input, an application that is processing a distributed web service request that requires access to an application hosted in the data center or generally another other type of program seeking access to an application in the data center.

As the needs of applications change, the resources or the data center may be reconfigured to provide the needed level of service to the applications using the minimum amount of hardware resources deemed desirable. Depending on application requirements, applications may be reassigned to share certain servers, servers may be added to the data center, or certain servers may be dedicated to certain applications.

Figure 2:
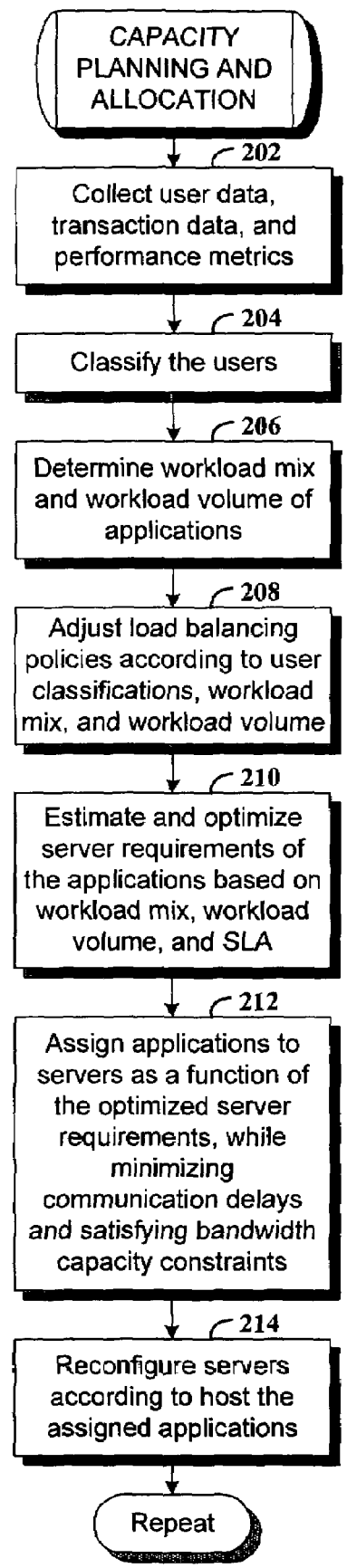
FIG. 2 is a flow chart of an example process that supports planning for needed capacity of a data center and automatically assigning resources in accordance with various embodiments of the invention.

FIG. 2 is a flow chart of an example process that supports planning for needed capacity of a data center and automatically assigning resources in accordance with various embodiments of the invention. The various embodiments of the invention may be applied to different types of application architectures as deployed on various configurations of servers in a data center. However, for purposes of explanation, the processing of web transactions from browsers to web servers to any additional backend application servers is used to illustrate operations of the various embodiments.

As part of an ongoing effort to see that application requirements are being satisfied by a data center and that the data center is allocating resources efficiently, various transaction data is collected (step 202). This transaction or instrumentation data may include data that identify transactions, classify transactions, identify requesters, and quantify responsiveness of various components involved in processing the transaction. Data collected at various components involved in processing the transactions may be correlated by transactions as further explained below.

For performance characterization, the instrumentation data gathered in processing web transactions may be classified according to user and transaction (steps 204 and 206). In classifying users, the subset of the user population from which a Web transaction originates is identified. For example, users may be classified as human or robots. Another class of users may be made based on purchasing behavior. For example, humans who make frequent purchases versus humans whose purchases are infrequent.

Various techniques are known for classifying users. In an example application of one technique, the inter-arrival times in long sessions are analyzed to identify transactions that appear as though they originated from a shopping robot, as well as some which may have originated from multiple human users connected through a proxy server. Various methods may be employed to classify users as explained in the following paragraphs.

The inter-arrival times of requests generated by a typical robot have different characteristics from those generated by a human. A robot that explores a site systematically to catalog its pages will generate in quick succession many requests, numbering in the tens or hundreds. In contrast, a human will typically generate only a small number of requests, usually fewer than ten, that are further spaced-out because of the time to read the returned page.

Another method of classifying users employs the IP address of the client (the originator of the request). Robots of the common search engines (Google, Yahoo, etc.) have readily identifiable IP addresses.

A third method of classifying users employs the "agent string" of the HTTP request. For example, a group of multiple human users connected through a common proxy server (like WebTV) will appear to have the IP address of the proxy and will generate long sessions, and thus might be mistaken for a robot. By looking at the agent string, for example, "Mozilla/3.0 WebTV/1.2 (compatible; MSIE 2.0)", one may correctly classify the session as arising from the WebTV proxy.

Preliminary classifications may be confirmed by the agent strings appearing in those sessions. The ability to predict the characteristics of an incoming session may be used in load balancing of web and application servers.

In transaction classification, a given URI is mapped into a transaction class. For example, a URI www.shop.com/estore/browse?item=1 may be classified as a browse transaction, and a URI www.shop.com/estore/purchase?product=2 may be classified as a purchase transaction. In an example embodiment, a URI may belong to only one class. When a transaction belonging to a particular transaction class is detected, the process increases the count for that class of transaction. It will be appreciated that a timestamp may also be recorded in association with the transaction class for each transaction so that the volume of transactions of a particular class may be determined over a selected interval of time.

It will be appreciated that collecting and classifying the instrumentation data may continue to run in the background as the other steps (208, 210, 212, 214) for allocating resources are performed.

Based on the user classifications, workload mix, and workload levels the load balancing policies may be adjusted (step 208). In the context of web transactions, workload refers to transactions. In a data center having web servers and application servers, the policy of one load balancer may be adjusted to better distribute the workload between the various web servers. This may involve, for example, routing human-generated requests in a different way from routing of robot-generated requests. Similarly, traffic with resource-intensive requirements may be routed different from traffic with light resource requirements.

An example objective of a load distribution policy is to minimize some criterion such as the mean response time of a request and minimize the number of application servers allocated for a given SLA. There are several known load distribution policies. For example, the load may be distributed based on a round-robin, random, least-work-remaining or size-based policy. In an example embodiment, sessions are considered in load balancing. A session is a sequence of related Web requests. In the example policy, the assignment for routing is performed once per session. To implement a minimizing-variance aspect of the size-based policy, at the initial Web request of a session an estimation of the size of subsequent requests is made. Sessions comprising mostly small requests may be assigned to different servers from those comprising mostly large requests.

The benefits of a sophisticated distribution policy based on user and URI classification may be sufficient to merit reassigning a session after the request in the session have been observed over some period of time. This may provide a more accurate estimate of the sizes of subsequent requests in the session. For example, if shortly into a session it is determined that the session is driven by a robot that will issue one type of request a large number of times, it might be worthwhile to reassign the session to a server dedicated to those types of requests.

In addition to adjusting load balancing policies, the instrumentation data may also be used in estimating and optimizing server requirements (step 210). In one embodiment, a queuing model is used to approximate the average response time for a given number of servers at each tier, and an optimization process determines the minimum number of total servers required for the application average response time to be within the range of a specific SLA. It will be appreciated, however, that other models and or techniques may be used to perform the estimation. These models and techniques include simulation and closed-loop control based on actual measurements. The simulation method achieves the same purpose for estimating the average response time by mimicking the system operation in software codes; while closed-loop control measures the actual average response time and then compares to the range of response time specified in the SLA. If the actual measured response time is longer than that specified in the SLA, servers (resources) are added; otherwise if measured is shorter than specified, servers (resources) are taken away. The example queuing model has advantages over the simulation and the control techniques in that it achieves computationally fast predictions of resources required to fulfill the SLA and is amenable for easy automation.

In the queueing model, the problem is to determine the probability distribution function of the response time to a request given: (1) the numbers of servers at the backend tiers, $N_{web}$, $N_{app}$, and $N_{DB}$ (the backend tiers including web servers, applications servers, and database servers) where $N_{web}$, $N_{app}$, and $N_{DB}$ are number of web servers, applications servers, and database servers respectively; and (2) the mix and volume of the incoming requests $(\lambda_1, \lambda_2, \ldots)$. That is, a function $f(.)$ is sought such that $Pr(R \leq r) = f(r|N_{web}, N_{app}, N_{DB}, \lambda_1, \lambda_2, \ldots)$, where R is the random variable response time (or system residence time) of a request, r is any arbitrary level such as 0.1 second or 2 seconds.

The system may be modeled in the aggregate, with a simplified representation of the routing of requests through the system. Specifically, the system may be modeled as an open queueing network, with three tiers arranged in series, and parallel, identical servers within each tier. With this assumption, the multiple-pass processing of returned requests is aggregated into a one-pass simplified flow (from web server to an application server to a database server to exiting the system). Furthermore, each server is represented as a processor-sharing queue with one critical resource (e.g., a CPU or disk). The service demand of a request at a server is the sum of processing times of the multiple passes of this request at the server.

The expected response time may be described as the sum of response times at each of the three tiers:

$$E[R] = \frac{E[S_{web}]}{1 - \lambda_{web}E[S_{web}]/N_{web}} + \frac{E[S_{App}]}{1 - \lambda_{App}E[S_{App}]/N_{App}} + \frac{E[S_{DB}]}{1 - \lambda_{DB}E[S_{DB}]/N_{DB}}$$

where $\lambda_{web}$ is the arrival rate of new requests into the web server tier, which is the sum of all customer request types that require processing at the web server tier; $E[S_{web}]$ is the average service demand at the web server tier averaged over all request types and including multiple passes of processing; and $N_{web}$ is the number of servers at the web server tier. Similar notation applies to the application and database server tiers.

The formula above assumes a processor-sharing queue at each server. It is also assumed that the servers within each tier are identical and share approximately the same workload, which implies that the arrival rate at each server is $\lambda_{web}/N_{web}$.

It is possible that only a fraction of all customer requests require routing into the application or database server tiers. In this situation it may generally be the case that $\lambda_{DB} \leq \lambda_{app} \leq \lambda_{web}$. These arrival rate parameters may be determined from the input workload mix and volume $(\lambda_1, \lambda_2, \ldots)$.

To obtain an estimation of the service demand at the web server tier $E[S_{web}]$, the relationship $u_{web} = \lambda_{web} E[S_{web}]/N_{web}$, where $u_{web}$ is the average utilization rate of the critical resource (e.g., CPU) at the web server tier, to write $E[S_{web}] = u_{web}N_{web}/\lambda_{web}$.

The average queuing time of the multi-tiered system then becomes the response time of the tiered system (after possibly adding to it some fixed "overhead" delays at non-bottleneck resources such as the fixed processing time at the load balancer). A mathematical optimization model is next formulated to find the optimal number of servers at each of the tiers. The mathematical optimization model is described as follows.

The decision variables on which optimization is performed is the number of servers at each tier in the multi-tiered system. The objective function is the weighted sum of the number of servers at each tier, where the weights are the "costs" per server. A special case is when all weights are equal to 1, signaling that all servers at different tiers are equal, in which case the objective function is simply the total number of systems in the multi-tiered system.

The optimization model has one constraint: $E[R] \leq SLA_R$, where $SLA_R$ is the response time limit (such as 1 second) required by the SLA. Additionally, the number of servers at each tier is constrained to be an integer greater than or equal to one.

The resulting mathematical optimization model has a linear objective function but a non-linear, inequality-type constraint with integer-valued decision variables. A concavity property of the average response E[R] function is used with respect to the decision variables in formulating an efficient bounding procedure. The bounding procedure first ignores the integer-value requirements on the decision variables and solves the 2-tiered problem. The solution is then rounded to integer values. Then the 3-tiered problem is solved using the solution to the 2-tiered problem, and recursively to the general n-tiered problem.

Once the server requirements have been estimated and optimized, in one embodiment an assignment of applications to servers may be determined as a function of the optimal server requirements predicted in such a way communications delays are minimized and bandwidth capacity constraints are satisfied (step 212). The bandwidth capacity constraints are the actual bandwidth of the physical resources in the data center, for example. In one embodiment the physical topology of the resources is represented as a hierarchical tree, and for a given application with a tiered architecture and the estimated and optimized resource requirements of the application, the approach determines how to assign servers from the topology into the tier architecture in such a way that application resource requirements are satisfied and network latency is minimized. In one embodiment the servers may be assigned to the applications considering one application at a time. The discussion that accompanies FIG. 5 further explains various example embodiments for allocating resources for a specific example physical topology, and FIG. 6 is a flowchart of an example process for determining the allocation.

Once a solution has been arrived at for assigning the servers to the different tiers of the application, the solution may be implemented by reconfiguring the servers accordingly (step 214). The reconfiguration tasks may include removing and installing application software, changing registry settings, editing of configuration files, and running a command to start the application software. The various scripts and sequences of operations needed for reconfiguration will vary according to the type of server and characteristics of the application software. However, it will be appreciated that such scripts may use the information from the solution as input to automatically reconfigure the appropriate servers.

The adjusting load balancing policies, determining an allocation of resources, and automatically reconfiguring may be repeated as often as deemed necessary to achieve desired levels of performance and efficiency. Gathering of instrumentation data may continue to run in the background so that the necessary data is available for analysis when desired.

Figure 3:
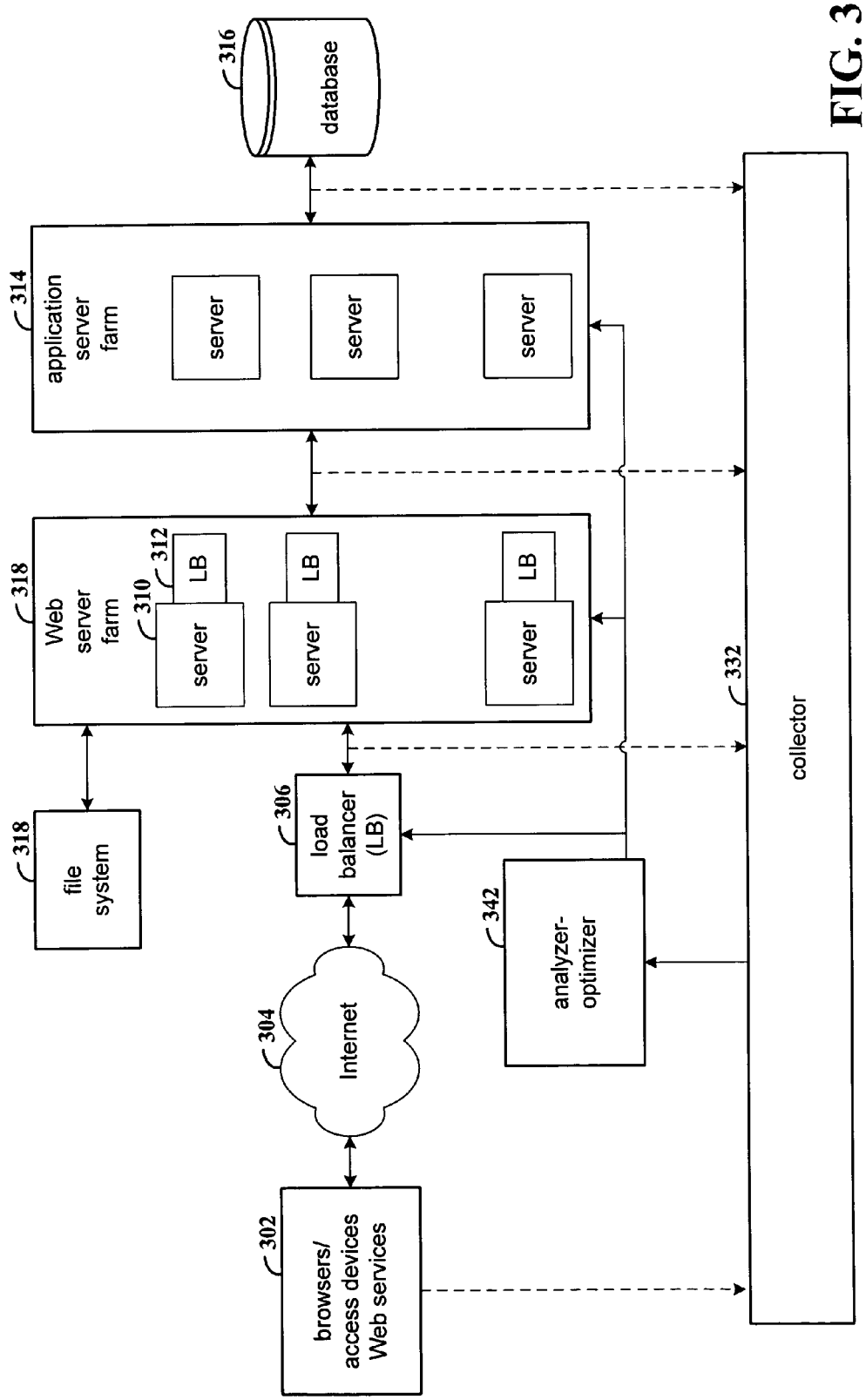
FIG. 3 is a functional block diagram of an example arrangement for gathering data to be used in analyzing resource requirements and allocations for applications hosted by a data center in accordance with various embodiments of the invention.

FIG. 3 is a functional block diagram of an example arrangement for gathering data to be used in analyzing resource requirements and allocations for applications hosted by a data center. The example data center resources are configured in support of a tiered architecture for processing web transactions. It will be appreciated, however, that the invention may be adapted and applied to other architectures and arrangements of data center resources. Generally, a web transaction begins at a client, for example a browser or Internet access device, or as web service (block 302). The web transaction flows through the Internet 304 to a load balancer 306.

The load balancer 306 may be a resource of the data center and may be the first tier of the web transaction processing architecture. The load balancer submits the web transaction to one of the servers in web server farm 308, which is the second tier. The load balancer may be configured to distribute the work amongst the servers 308 in any of a number of techniques suitable for the data center and application requirements. For example, the load balancer distribute transactions in a manner that minimizes response time and maximizes resource utilization.

The web servers 308 may each have an associated load balancer. For example, web server 310 has an associated load balancer 312. Each web server load balancer balances the workload between the servers in the application server farm 314, which is the third tier. The application servers 314 host the application logic that processes web transactions. For example, the application logic may read from or write to database 316 in processing the transaction.

File system 318 may be used to store the web pages that are served to the user, and also store the configuration information for the web and application servers. So, when processing a transaction, the application logic will read information from the file system. When an application server or a web server starts execution, it obtains its configuration information from the file system.

Collector 332 gathers instrumentation data pertaining to web transactions as the transactions are processed by each component from block 302 to database 316. Example data include the beginning and ending times of web page requests. The collector also correlates the instrumentation data by web transaction. The dashed lines indicate that the instrumentation data is coming from a particular point in the transaction flow to the collector.

Analyzer-optimizer block 342 generally analyzes the correlated instrumentation data, determines a desired configuration, and initiates reconfiguration of the load balancer 306, servers and load balancers in the web server farm 308, and servers in application server farm 314 as may be desirable. In an example embodiment, the analyzer-optimizer uses a queueing model to estimate and optimize server requirements of the applications based on mix of transaction types, the volume of the different transaction types, and a level of service that the data center is expected to provide. A mixed-integer programming technique may be used to allocate the resources of the data center from the optimized server requirements.

Figure 4:
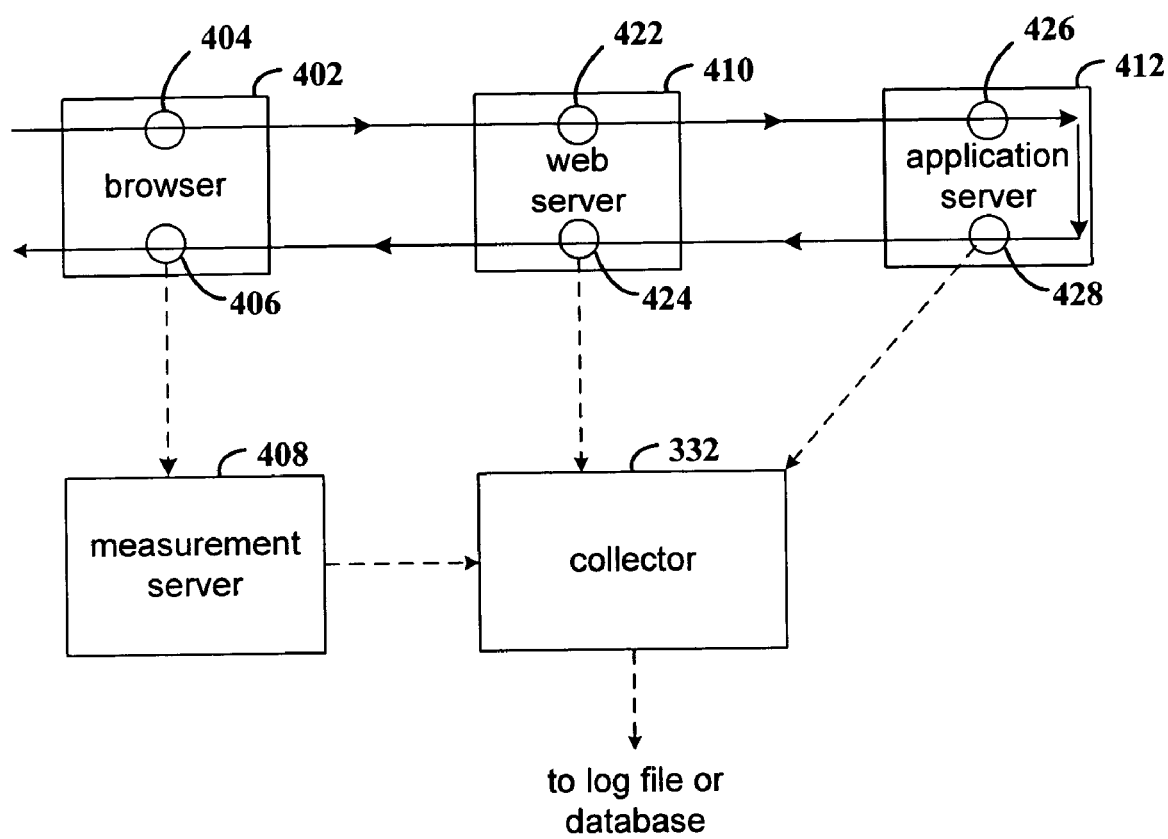
FIG. 4 illustrates a sensor arrangement used to provide instrumentation data to the collector in accordance with various embodiments of the invention.

FIG. 4 illustrates a sensor arrangement used to provide instrumentation data to the collector. Sensors are typically shared libraries or script components that intercept the actual processing of a transaction request. Each sensor is logically composed of two parts: a start part and an end part. For example, the sensor of browser 402 includes start part 404 and the corresponding end part 406. The start part performs the correlation aspects of the monitoring, and the end part forwards monitored data to collector 332 via measurement server 408.

The measurement server 408 acts as a surrogate web server to get measurement information from the browser. This is because the web browser is typically not allowed to pass any information to a server like a collector directly.

Because a web transaction flows through various heterogeneous components, for example browser 402, web server 410, and application server 412, the sensors may be implemented differently for the components. The solid directional lines between components 402, 410, and 412 illustrate the flow of a web transaction, and the dashed directional lines represent instrumentation data that is provided to the collector 332 from the sensors.

In an example embodiment, a browser sensor may be implemented using JavaScript code that is sent with each instrumented page. The instrumented page instructs the browser to inject the start and end parts of a sensor as the event handlers for selected events for the browser. The start part of the browser sensor generates a request identifier and passes the identifier along with the request to the web server. The end part of the browser sensor sends performance data to the collector 332 via measurement server 408.

The start part 422 of a web server sensor extracts the identifier from the web transaction and passes the identifier to the application server. The end part 424 of the web server sensor sends performance data and the web transaction to the collector.

The start part 426 and end part 428 of the application server sensor processes the transaction and sends instrumentation data to the collector 332. The start part and end part are only performing the measurement functions. The actual functionality of the transaction is carried out by the application server itself. The collector correlates the instrumentation data received by the individual components on the basis of the unique identifier associated with each transaction. The following paragraphs describe in more detail various embodiments of the sensors.

A web browser may be instrumented indirectly by instrumenting the web pages sent to the browser using JavaScript functions. A sensor start function is invoked when a new page is requested, and a sensor end function is invoked after the new page has been loaded. The sensors may be invoked via event handlers that fire when the user selects a URL to follow and when a particular page has finished loading.

The sensor start function records the time of the event and the current page of the click cookie. In addition to informing the server of the transaction identifier, the click cookie serves a further purpose. After the new page has been loaded and the sensor end function records the end time and uses the click cookie to obtain the transaction identifier (the transaction's start time) and the referrer URL of the transaction. The referrer URL is used as a heuristic to identify the stale click cookies. The instrumentation may be sent to the measurement server using a .wmi request.

In order to determine the response time of a transaction, excluding the latency imposed by the Internet, the web server is instrumented. The web server's response in combination with the client's response time supports distinguishing between configuration issues of the web site and issues introduced by the Internet.

The web server sensor may send the instrumentation data to the collector using UDP packets, for example. Different web servers may require different code to implement sensors because of a non-standardized scripting environments in the web servers. For example, different scripts may be employed for Apache web servers, Internet Information servers, and Netscape web servers.

In an example embodiment, the sensors for application servers are implemented by instrumenting the application pages. The following paragraphs describe instrumentation of Server Side Javascript, Active Server Pages, Java Server Pages, and Servelets.

Server Side Javascript (SSJS) was developed by Netscape for dynamically generating HTML pages. SSJS is a mixture of HTML and JavaScript, wherein one or more JavaScript fragments are enclosed in a special tag and are processed by the web application server. The fragments are processed in the order in which they appear on the page, potentially creating text that his included in the resulting HTML page.

SSJS fragments may communicate with other parts of the application hosted by the application server through the use of pre-defined objects. Some of these objects may be provided by the application server and others may be user defined. The mechanism by which user-defined objects are created is platform specific.

In an example embodiment, two SSJS fragments are included in each page: one at the top of the page and another at the bottom of the page. The top fragment is processed as soon as the page is loaded by the application server, and the bottom fragment is processed after the rest of the page is processed.

A user-defined object is created to record the start time of the beginning of the transaction. The setClickCookie method is used to pass the click cookie in the HTTP request to the object. This cookie is used to extract the identifier of the transaction of which this event is a part. The nextClickCookie is used to determine the value of the click cookie to be sent back to the client. After the client's request is processed, the reportEnd method sets the end time of the event and sends the instrumentation data to the collector.

Active Server Pages (ASPs) implement the server-side scripting technology that is used on Internet Information Servers (IISs). ASPs are nearly syntactically identical to SSJS pages, with ASPs accepting Visual Basic as the scripting language. In addition, user-defined objects must be implemented using the Common Object Model (COM). ASP pages may be instrumented using a user-defined COM object along with JavaScript fragments at the top and bottom of each page.

The foregoing techniques may be similarly adapted to instrument Java Server pages.

A Java servlet may be instrumented by modifying the web.xml configuration file, which describes the Servlet and specifies its main class that must implement to the HttpServlet interface. The main class may be replaced with a wrapper class that implements the HttpServlet and forwards all requests to the original main class whose name is specified via an additional initialization parameter.

The following paragraphs describe how the instrumentation data gathered from the various components involved in a web transaction may be correlated in encountering a variety of instrumentation scenarios. The following example definitions may be useful. A web transaction is a request by a user that starts at a browser by the user clicking on or typing a URI, that is transmitted via the Internet to a web server, and that may be processed by one or more back-end application servers. A requested page is the HTML page that is the object of a web transaction. A referrer page is the HTML page, if any, in which the user clicked to obtain the requested page.

In the example embodiment, the correlation technique takes into account that instrumentation may not be in place at all times. For example, the referrer page may not always be instrumented, the requested page may not always be instrumented, and the web servers or other back-end servers may not always be instrumented. Instrumentation may not be operative to address demands for low overhead in processing web transactions.

First described is a scenario in which all components are instrumented, followed by a description of a scenario in which one or more components are not instrumented. A configuration involving only one web browser and one web server is used, and the correlation may be extrapolated to various configurations that include application servers.

Two cookies are used to transmit information among the various components in a web transaction. The click cookie transmits the referrer page and the time at which the user clicked on the link in the referrer page. The load cookie transmits the time at which the requested page was loaded in the client's browser.

In an example scenario, a user is browsing through an instrumented page, A. Page A is instrumented such that whenever the user clicks on a URI, a JavaScript function records A:t1 (t1 is a timestamp) in the click cookie. Thus, when the user clicks on the URI for a page B, an appropriate click cookie is generated. The HTTP request is then sent to the web server. Because the web server is also instrumented, it records the timestamps before (t2) and after (t3) the processing of the request and sends these times to the collector 332 along with the start time t1 from the click cookie, which is used as the transaction identifier. The web server then sends its response back to the browser.

After the browser receives the requested page, it timestamps the end of the lading phase by noting the end time (t4) in a load cookie. Because this page is instrumented, a spurious requested is added at the end of the page, after setting the load cookie, for a .wmi page. The instrumented web server understands that the .wmi request is a spurious request that is only for the purpose of instrumentation. The web server takes the client's start and stop times, t1 and t4, from the click and load cookies, respectively, and sends the times to the collector 332. The collector is able to correlate these times with those of the web server because it uses t1 as the identifier for the transaction.

The following paragraphs explain scenarios in which various components are not instrumented. If the referrer page is not instrumented, then the click cookie will not be set. The web server will report its data to the collector using its own start time as the transaction identifier. When the requested page is loaded, the web server will recognize that the click cookie is not set and so will not send a .wmi request. Therefore, no client-side instrumentation data will be obtained for the request.

If the web server is not instrumented, then no server instrumentation data will be obtained. Client instrumentation data will be gathered and reported to the measurement server in the form of .wmi requests, which will store the client perceived performance and pass the data on to the collector. The measurement server gets the client's instrumentation data so it can compute statistical properties for the client-perceived response times.

If the requested page is not instrumented, then no instrumentation data will be obtained from the client. The web server will record its beginning and ending processing times and transmit these values to the collector. The web server start time is used as the transaction identifier instead of the client start time.

If the referrer page is instrumented, the requested page is not instrumented, but a subsequent requested page is instrumented, then the above-described click cookie approach may fail. The click cookie approach may fail because the cookie will incorrectly monitor the start time of the click for the first page as the start time of the second page. To avoid this problem, the referrer:timestamp is used in the click cookie. This allows the load function to check whether the click cookie is stale by comparing the referrer value in the cookie with its own record of the referrer through the history object.

The collector 332 may be implemented as a server that receives via UDP the data generated by the instrumentation sensors. A basic task may be to correlate the data received by the applications servers' sensors. This may be necessary because the sensors send the instrumentation data in an unprocessed form, and thereby providing some instrumentation data for the current request and some instrumentation data for the previous request. The correlated data may be written to a log file or stored in a relational database, for example.

In an example embodiment, datagram packets are used to communicate instrumentation data from the sensors to the correlator. The data may be formatted using a keyword:value format, where the keyword identifies the instrumentation data and the value is the actual instrumentation data. The information may include, for example, a request identifier, an identifier of a previous transaction, a name of the requested web page, the name of the referrer web page, the location of the client, the start time of the client, the end time of the client, the location of the web server that processed the request, the start time of the web server, the end time of the web server, the location of the application server that processed the request, the start time of the application server, the end time of the application server, the load cookie sent by the client, and the click cookie sent by the client.

Figure 5:
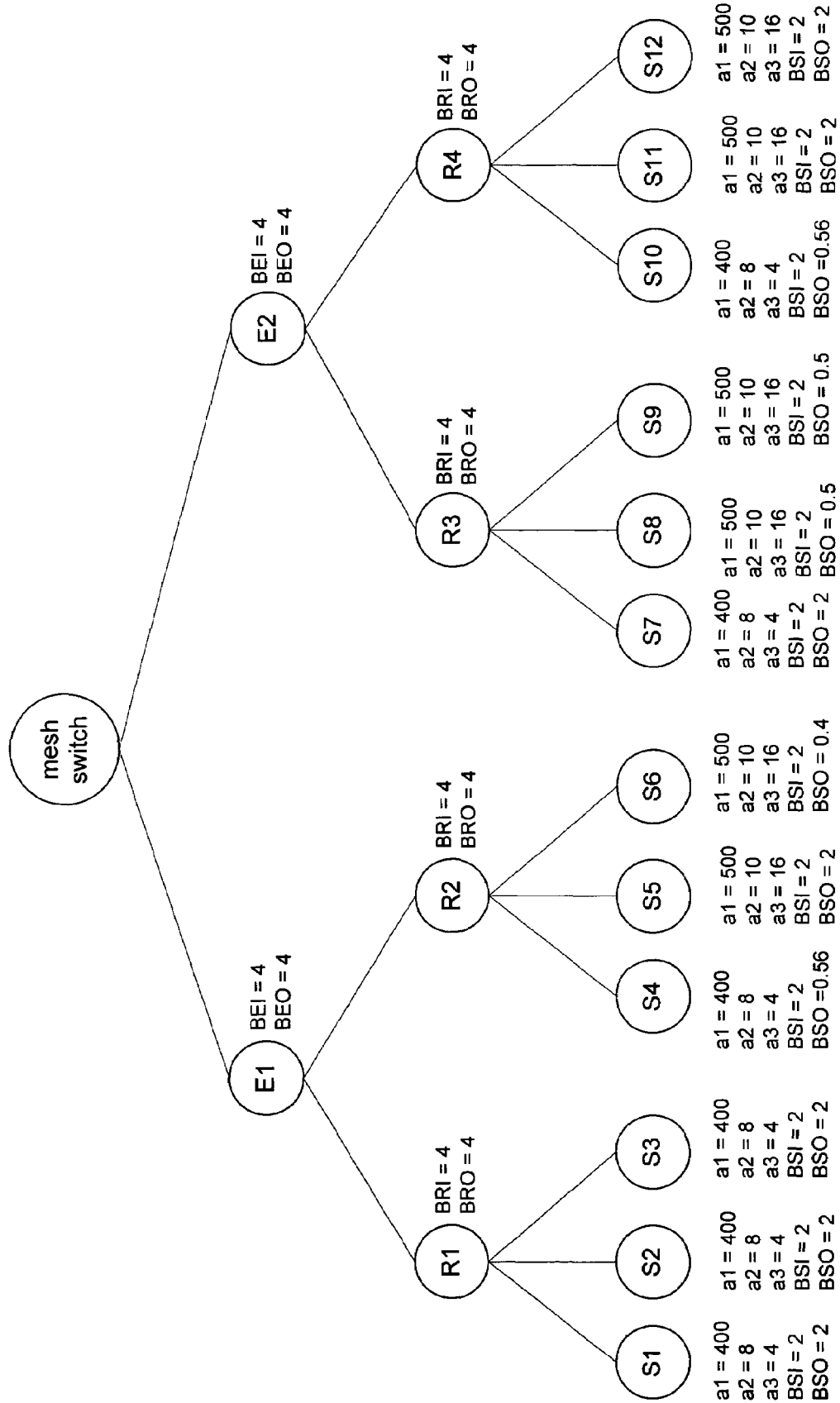
FIG. 5 is a graph that illustrates a physical topology of a small example set of servers, rack switches, edge switches, and a main switch.
Figure 6:
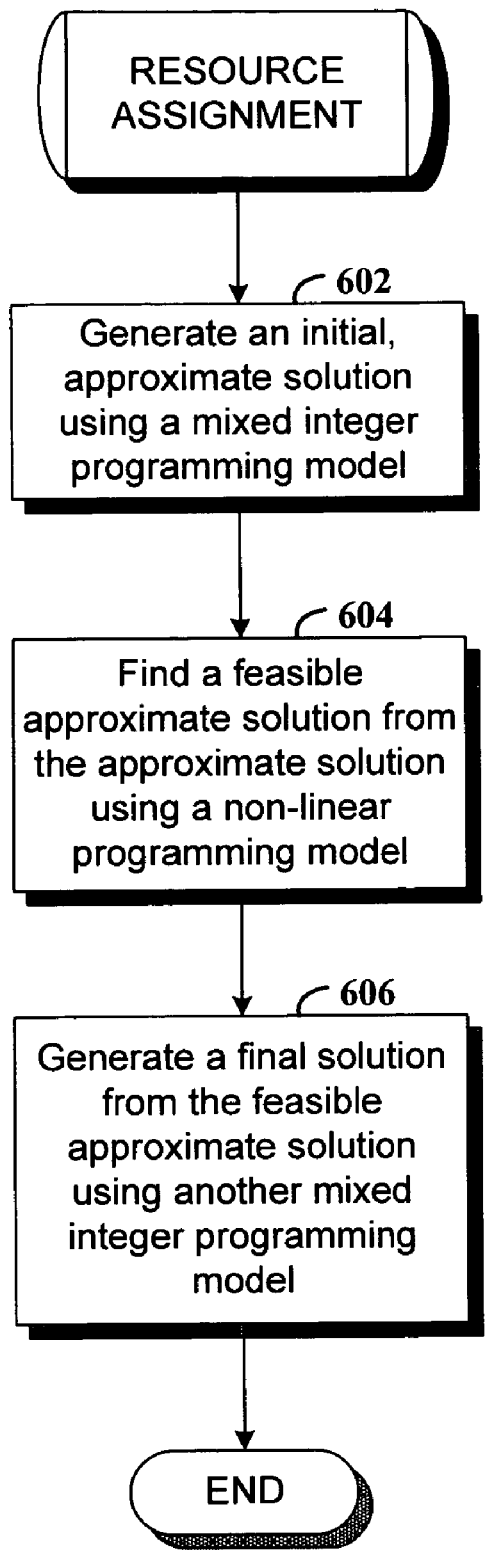
FIG. 6 is a flowchart of an example process for determining an assignment of resources in a physical topology to an application architecture in accordance with various embodiments of the invention.

FIG. 5 is a graph that illustrates a physical topology of a small example set of servers, rack switches, edge switches, and a main switch. The graph is used in to illustrate the application of the various embodiments of the process of determining an allocation of resources for a given set of applications. In one embodiment the layout of the physical topology is a hierarchical tree. The root 502 of the tree represents a mesh switch, and there are two edge switches connected to the mesh switch, as represented by nodes labeled E1 and E2. There are four rack switches represented as nodes R1, R2, R3, and R4 in the graph. Rack switches R1 and R2 are connected to edge switch E1, and rack switches R3 and R4 are connected to edge switch E2. There are 12 servers in the topology, with three connected to each rack switch. The servers are represented as nodes labeled S1 ... S12.

Each node other than the mesh node has an associated set of attributes. For example, each of the servers has attributes for CPU speed, memory size, and storage capacity (labeled a1, a2, and a3), along with incoming and outgoing bandwidth capacities (labeled BSI and BSO). Each of the rack switches has an associated pair of incoming and outgoing bandwidth capacities (labeled BRI and BRO), and do each of the edge switches (labeled BEI and BEO). The problem is to identify which servers S1 ... S12 in the physical topology to allocate to the application architecture in such a way that latency in communications delay between servers is minimized, while bandwidth capacity constraints and Min/Max server attribute requirements are satisfied. The complexity of the problem may be recognized where a data center comprises thousands of geographically dispersed servers hosting hundreds of different applications.

FIG. 6 is a flowchart of an example process for determining an assignment of resources in a physical topology to an application architecture in accordance with various embodiments of the invention. The first step in the process is to generate an initial, approximate solution (step 602). In the example embodiment, a mixed integer programming model is used to generate the initial solution. The model attempts to minimize the weighted number of rack switches and edge switches in the initial solution. The initial solution may not satisfy all bandwidth capacity constraints.

Using the initial solution as a starting point, a feasible approximate solution is generated using a non-linear programming model (step 602). Specifically, a quadratic programming approximation (QP) of the original problem is used while relaxing the number of feasible servers at a rack switch required to satisfy application requirements.

Using the feasible approximate solution as a starting point, the final solution is generated using another mixed integer programming model (step 606). This second mixed integer model intelligently rounds the approximate, feasible solution from the QP model and determines the actual servers to assign to the applications. Steps 602, 604, and 606 are further described in the following paragraphs.

The mathematical formulation may be based on the following assumptions.

1. The physical topology is a hierarchical tree.
2. The application has a tiered architecture.
3. Servers at the same tier have the same functionality. Consequently, they have the same attribute requirements.
4. The amount of traffic generated by different servers in the same tier is similar. And the amount of traffic coming into each tier is evenly distributed among all the servers in the tier.
5. No traffic goes between servers in the same tier.

When it is necessary to consider applications with more general architecture or traffic characteristics, the mathematical models presented below can be easily extended to deal with these variations.

The following notation is used in the description to describe the mathematical formulation of the resource allocation problem (RAP).

l∈L: Set of tiers or layers, where |L| represents the number of tiers. [Alternative index i]

s∈S: Set of servers. |S| represents the number of servers. [Alternative index j]

a∈A: Set of attributes for servers. |A| represents the number of attributes.

r∈R: Set of rack switches. |R| represents the number of rack switches. [Alternative index q]

e∈E: Set of edge switches. |E| represents the number of edge switches.

The network topology of the IDC can be captured using the following sets.

$SR_r \subset S$: Set of servers connected to rack switch r.

$SE_e \subset S$: Set of servers connected to edge switch e.

: Set of rack switches connected to edge switch e.

The attributes of servers in the physical topology are represented by the matrix V, where each element $V_{as}$ represents the value of the attribute a of server s. The bandwidth capacity of servers, rack and edge switches in the physical topology are represented by the following set of parameters:

$BSI_s$: The incoming bandwidth of server s.

$BSO_s$: The outgoing bandwidth of server s.

$BRI_r$: The incoming bandwidth of rack switch r.

$BRO_r$: The outgoing bandwidth of rack switch r.

$BEI_e$: The incoming bandwidth of edge switch e.

$BEO_e$: The outgoing bandwidth of edge switch e.

The application architecture requirements are represented by the following parameters. The number of servers to be allocated to tier l is defined by $N_l$. The maximum and minimum attribute requirements are represented by two matrices VMAX and VMIN, where each element $VMAX_{la}$ and $VMIN_{la}$ represent the maximum and minimum level of attribute a for any server in tier l. The matrix T is defined to characterize the traffic pattern of the application, where the element $T_{li}$ represents the maximum amount of traffic going from each server in tier l to each server in tier i. The numbers $T_{01}$ and $T_{10}$ represent the Internet traffic coming into and going out of each server in tier 1. Using these traffic parameters, the total amount of incoming and outgoing traffic at each server in different tiers may be calculated, denoted by $TI_l$ and $TO_l$, respectively.

Thus far, the input parameters to RAP have been defined. The decision variables are defined next. In the optimization problem the decision to be made is which server in the physical topology should be assigned to which tier. The following matrix of binary variables represents this.

$$x_{ls} = \begin{cases} 1 & \text{server } s \text{ assigned to tier } l \\ 0 & \text{otherwise} \end{cases}$$

In summary, the mathematical optimization problem for RAP is the following.

$$\text{Max} \sum_{r \in R} \sum_{j \in SR_r} \sum_{i \in L} \sum_{l \in L} \sum_{s \in SR_r} T_{li} x_{ls} x_{ij} + \sum_{e \in E} \sum_{j \in SE_e} \sum_{i \in L} \sum_{l \in L} \sum_{s \in SE_e} T_{li} x_{ls} x_{ij}$$

Subject to:

$$\sum_{s \in S} x_{ls} = N_l, l \in L \quad (1)$$

$$\sum_{l \in L} x_{ls} \leq 1, s \in S \quad (2)$$

$$\sum_{l \in L} VMIN_{la} x_{ls} \leq \left(\sum_{l \in L} x_{ls}\right) V_{as} \leq \sum_{l \in L} VMAX_{la} x_{ls}, a \in A, s \in S \quad (3)$$

$$\sum_{l \in L} TO_l x_{ls} \leq BSO_s, s \in S \quad (4)$$

$$\sum_{l \in L} TI_l x_{ls} \leq BSI_s, s \in S \quad (5)$$

$$\sum_{l \in L} \sum_{s \in SR_r} TO_l x_{ls} - \sum_{j \in SR_r} \sum_{i \in L} \sum_{l \in L} \sum_{s \in SR_r} T_{li} x_{ls} x_{ij} \leq BRO_r, r \in R \quad (6)$$

$$\sum_{l \in L} \sum_{s \in SR_r} TI_l x_{ls} - \sum_{j \in SR_r} \sum_{i \in L} \sum_{l \in L} \sum_{s \in SR_r} T_{li} x_{ls} x_{ij} \leq BRI_r, r \in R \quad (7)$$

$$\sum_{l \in L} \sum_{s \in SE_e} TO_l x_{ls} - \sum_{j \in SE_e} \sum_{i \in L} \sum_{l \in L} \sum_{s \in SE_e} T_{li} x_{ls} x_{ij} \leq BEO_e, e \in E \quad (8)$$

$$\sum_{l \in L} \sum_{s \in SE_e} TI_l x_{ls} - \sum_{j \in SE_e} \sum_{i \in L} \sum_{l \in L} \sum_{s \in SE_e} T_{li} x_{ls} x_{ij} \leq BEI_e, e \in E \quad (9)$$

$$x_{ls}, x_{ij} \in \{0, 1\}, \quad l, i \in D, \quad s, j \in M$$

This formulation is referred to as the original mathematical optimization problem, labeled as P0. Since the objective function is nonlinear and there are nonlinear constraints, the optimization model is a nonlinear programming problem with binary variables, which cannot be solved efficiently by commercially available mathematical programming solvers.

To reduce the number of binary variables $x_{ls}$ in the formulation, a feasibility matrix F is defined as follows.

$$F_{ls} = \begin{cases} 1 & \text{if } x_{ls} = 1 \text{ satisfies (3), (4) and (5) of } P0; \\ 0 & \text{otherwise.} \end{cases}$$

It is used to pre-screen the servers that are infeasible. An additional constraint $x_{ls} \in \{0, F_{ls}\}$ is imposed.

In this section, an approach is developed that comprises a series of mathematical optimization formulations that solves RAP heuristically and efficiently. The series of mathematical optimization models are variations and relaxations of the original formulation P0. The approach has three steps. Each step employs a mathematical optimization formulation that may be solved by commercial solvers. The three steps are:

1. Find a good initial approximate solution. An MIP problem is formulated that minimizes the number of rack switches and edge switches involved. Conceptually, this objective function is a surrogate of the original objective function where latency is minimized. In this formulation, there is no visibility of the specific servers that are feasible in terms of the application requirements, but the number of feasible servers at each rack is visible. The solution generated by this MIP formulation does not consider rack and edge switch bandwidth constraints, which is why it is only an approximate solution. This MIP problem can be solved using CPLEX.

2. Given the above approximate solution as an initial solution, a relaxation of the original problem is solved by formulating a nonlinear optimization problem in terms of the number of feasible servers at each rack switch allocated to the application. This formulation is equivalent to the original mathematical optimization formulation P0. However, in this case the formulation is a relaxation because all the decision variables can be continuous variables instead of integer variables. Since this nonlinear formulation provides only local optima instead of global ones step 1 is needed. This nonlinear optimization problem can be solved using MINOS.

3. Given the local optimal solution from step 2, find a good solution to the original problem. Another MIP is formulated that essentially rounds the local optimal solution and identifies the exact servers that satisfy the requirements of the application. CPLEX solves this MIP problem.

The following discussion begins with the nonlinear optimization formulation (step 2 above) because this formulation is at the core of the solution approach. Then, the MIP formulation that comprises step 3 is described, which chooses the specific servers. Finally, the MIP formulation in step 1 is described, which determines good initial solutions for input to the nonlinear optimization problem.

For combinatorial optimization problems with binary variables, it is sometimes advisable, if possible, to reformulate the problem in terms of continuous variables over an interval. This brings convexity to the formulation and helps the continuous relaxation to be stronger, which means that the relaxation will give tighter bounds. For this purpose, a quadratic programming approximation of the original problem is formulated, referred to as QP.

A new decision variable is defined as follows.

$xr_{lr}$: Number of feasible servers connected to rack switch r that are allocated to tier l.

$xr_{lr} \in [0, N_l]$.

For a given rack r, $$xr_{lr} = \sum_{s \in SR_r} F_{ls} x_{ls}.$$

The variable $xr_{lr}$ appears in the QP formulation if and only if $$\sum_{s \in SR_r} F_{ls} \geq 1,$$

which means the rack switch r has a feasible server for tier l. To simplify the notation, a new set is defined, which is the set of servers connected to rack switch r that are feasible for tier l. Each constraint in the original problem P0 is reformulated in terms of $xr_{lr}$. The resulting QP formulation follows.

$$\text{Max } ZQP = \sum_{r \in R} \sum_{i \in L} \sum_{l \in L} T_{li} xr_{lr} xr_{ir} + \sum_{e \in E} \sum_{r \in R_e} \sum_{i \in L} \sum_{l \in L} T_{li} xr_{lr} xr_{ir} \quad (0)$$

Subject to:

$$\sum_{r \in R} xr_{lr} = N_l, l \in L \quad (1)$$

Constraints (2). A 3-tier architecture is assumed; extensions to other number of tiers can be easily considered. For all $r \in R$, $$xr_{l1r} + xr_{l2r} + xr_{l3r} \leq |FSR_{l1r} \cup FSR_{l2r} \cup FSR_{l3r}| \quad (6)$$
$$xr_{l1r} + xr_{l2r} \leq |FSR_{l1r} \cup FSR_{l2r}|$$
$$xr_{l1r} + xr_{l3r} \leq |FSR_{l1r} \cup FSR_{l3r}|$$
$$xr_{l2r} + xr_{l3r} \leq |FSR_{l2r} \cup FSR_{l3r}|$$
$$0 \leq xr_{l1r} \leq |FSR_{l1r}|, 0 \leq xr_{l2r} \leq |FSR_{l2r}|, 0 \leq xr_{l3r} \leq |FSR_{l3r}|$$
$$\sum_{l \in L} TO_l xr_{lr} - \sum_{i \in L} \sum_{l \in L} T_{li} xr_{lr} xr_{ir} \leq BRO_r, r \in R$$
$$\sum_{l \in L} TI_l xr_{lr} - \sum_{i \in L} \sum_{l \in L} T_{li} xr_{lr} xr_{ir} \leq BRI_r, r \in R \quad (7)$$
$$\sum_{r \in R_e} \sum_{l \in L} TO_l xr_{lr} - \sum_{q \in R_e} \sum_{r \in R_e} \sum_{i \in L} \sum_{l \in L} T_{li} xr_{ls} xr_{iq} \leq BEO_e, e \in E \quad (8)$$
$$\sum_{r \in R_e} \sum_{l \in L} TI_l xr_{lr} - \sum_{q \in R_e} \sum_{r \in R_e} \sum_{i \in L} \sum_{l \in L} T_{li} xr_{ls} xr_{iq} \leq BEI_e, e \in E \quad (9)$$
$$xr_{lr} \geq 0, l \in L, r \in R \ni \sum_{s \in SR_r} F_{ls} \geq 1$$

The next portion of the discussion describes a Mixed Integer Programming problem, MIP2, to intelligently round the local optimal solution generated by the QP model. The MIP2 model defines the actual servers to allocate to the application. The decision variables are the same as those in the original problem P0.

$$x_{ls} = \begin{cases} 1 & \text{server } s \text{ assigned to tier } l \\ 0 & \text{otherwise} \end{cases}$$

The first two constraints of the model are similar to those for the P0 problem.

$$\sum_{s \in S} x_{ls} = N_l, l \in L \quad (1)$$

$$\sum_{l \in L} x_{ls} \leq 1, s \in S \quad (2)$$

For each rack switch r and tier l, allocate as many servers as recommended by the local optimal solution, $xr^*$, from the QP model.

$$\sum_{s \in SR_r} x_{ls} \geq \lfloor xr_{lr}^* \rfloor \text{ if } xr_{lr}^* > 0 \quad (3)$$

As previously explained, constraints (3), (4) and (5) of the original problem P0 are captured by the feasibility matrix F. Accordingly, another constraint, $x_{ls} \in \{0, F_{ls}\}$, is imposed to ensure that the variable $x_{ls}$ appears in the formulation if and only if $F_{ls}=1$. Incoming and outgoing bandwidth capacity constraints are not considered because these constraints are satisfied by the solution of the QP model. The MIP2 model is just rounding the QP solution without modifying total traffic going through rack switches and edge switches.

The objective function is to minimize the number of servers allocated.

$$\text{Min} \sum_{l \in L} \sum_{s \in S} x_{ls} \quad (0)$$

It may be observed that the above objective function is a constant, $$\sum_{l \in L} N_l,$$

due to constraint (1). The reason why it is imposed is not that the rounding model needs it. Instead, it is because the commercial solver used for mixed integer programming may require that an objective function be specified. Due to the fact that all feasible solutions have the same objective function value, the minimization does not enforce anything, which is desirable in this case. In some other cases, it may be desirable to use the objective function to minimize the total "cost" of allocating servers to the application.

In summary, the MIP2 formulation is as follows:

$$\text{Min} \sum_{l \in L} \sum_{s \in S} x_{ls} \quad (0)$$

subject to:

$$\sum_{s \in S} x_{ls} = N_l, l \in L \quad (1)$$

$$\sum_{l \in L} x_{ls} \leq 1, s \in S \quad (2)$$

$$\sum_{s \in SR_r} x_{ls} \geq \lfloor xr^*_{lr} \rfloor \text{ if } xr^*_{lr} > 0 \quad (3)$$

$$x_{ls} \in \{0, F_{ls}\}$$

In the following discussion, a Mixed Integer Programming problem, MIP1, is formulated to generate a good initial solution for the QP model. The MIP1 formulation is based on the following intuitions. First, if there is a feasible server assignment under a single rack switch that satisfies constraints (1) to (5) of the original problem P0, then this solution is most likely feasible for the rack and edge switches bandwidth constraints (6) to (9). Second, this feasible server assignment is optimal for P0 because the objective function of P0 is formulated as minimizing the weighted average of the number of hops between each pair of servers, i.e., $$\text{Min } \hat{z} = 2F^R + 4F^E + 6F^M,$$

where $F^R$, $F^E$ and $F^M$ are the total amounts of inner traffic at all rack switches, edge switches and mesh switch, respectively. In addition, $$F^R + F^E + F^M = \sum_{l \in L} \sum_{i \in L} N_l T_{li} N_i,$$

which is a constant. Let it be denoted by C. Hence, $\hat{z} = 2C + 2F^E + 4F^M$. Because $F^E \geq 0$ and $F^M \geq 0$, $\hat{z} \geq 2C$ follows. The optimum is achieved if and only if $F^R = C$ and $F^E = F^M = 0$, which is the case when only servers under one rack switch are chosen. Furthermore, even if more than one rack switch is needed, the intention will be to minimize $F^E$ and $F^M$ as much as possible. Observer that $F^E$ is larger when more rack switches are involved, and $F^M$ is larger when more edge switches are involved. Therefore, the idea in the MIP1 model is to try to allocate servers that are in the same rack or that are in "closer" racks, where two racks are considered to be close if they are connected to the same edge switch.

Based on the above discussion, the objective function of the MIP1 formulation is a surrogate function of the objective function of P0. Roughly speaking, the objective of MIP1 is to minimize the total weighted usage of rack and edge switches. Consequently, the MIP1 problem is formulated as a "Facility Location Optimization Problem". The following "location" variables are defined:

$$\text{For each } e \in E, u_e = \begin{cases} 1 & \text{if edge switch } e \text{ is used} \\ 0 & \text{otherwise} \end{cases}$$

$$\text{For each } r \in R, v_r = \begin{cases} 1 & \text{if rack switch } r \text{ is used} \\ 0 & \text{otherwise} \end{cases}$$

The weights for these location variables are chosen so that the minimization of the objective function emulates the direction of optimality in the original problem P0. In particular, the weight for each switch used is defined to be the latency measure (number of hops) for that switch, i.e., $CR_r = 2$, and $CE_e = 4$.

The main issue with the original formulation P0 is that the combinatorial optimization problem has binary variables, quadratic constraints, and a quadratic objective function. Having removed the nonlinearity from the objective function in MIP1 already, the quadratic bandwidth constraints may be removed for rack and edge switches to linearize the problem. Therefore, the MIP1 formulation is an approximation of the original problem P0. It is not guaranteed to generate a feasible solution for P0. However, this is acceptable since the goal of the MIP1 model is to generate good initial solutions for the QP model, which explicitly considers the quadratic constraints removed in the MIP1 formulation.

As in the QP model, a 3-tier architecture for the application is assumed. Extensions to other number of tiers are easy to implement. Similar to the QP formulation, $x_{lr}$ is defined as the number of feasible servers in rack switch r allocated to tier l. The $x_{lr}$ appears in the formulation if and only if rack switch r has a feasible server for tier l. The constraints of the MAP1 formulation are as follows.

Constraint 1) The total number of servers allocated to tier l is $N_l$.

$$\sum_{r \in R} xr_{lr} = N_l, l \in L \quad (1)$$

Constraint 2) Allocate at most one server to a tier and ensure that no server allocated is double counted.

$$xr_{l1r} + xr_{l2r} + xr_{l3r} \leq |FSR_{l1r} \cup FSR_{l2r} \cup FSR_{l3r}|$$

$$xr_{l1r} + xr_{l2r} \leq |FSR_{l1r} \cup FSR_{l2r}|$$

$$xr_{l1r} + xr_{l3r} \leq |FSR_{l1r} \cup FSR_{l3r}|$$

$$xr_{l2r} + xr_{l3r} \leq |FSR_{l2r} \cup FSR_{l3r}|$$

$$0 \leq xr_{l1r} \leq |FSR_{l1r}|, 0 \leq xr_{l2r} \leq |FSR_{l2r}|, 0 \leq xr_{l3r} \leq |FSR_{l3r}|$$

Constraint 3) These are logical constraints over the binary variables $u_e$ and $v_r$ that ensure that these variables behave as intended. If servers are to be allocated from rack switch r to tier l then rack switch r needs to be "used". That is,
$v_r = 1$ if $xr_{lr} > 0$;
$v_r = 0$ if $xr_{lr} = 0$.

Therefore, the following constraint is defined:

$$N_l v_r \geq xr_{lr}, FSR_{lr} \neq \emptyset \quad (3.1)$$

where the coefficient of the variable $v_r$ is an upper bound of the variable $xr_{lr}$. Note that condition 1 is satisfied by constraint (3.1), and condition 2 is satisfied by this constraint and because the weighted summation of $v_r$ variables are being minimized, at optimality $v_r = 0$ if $xr_{lr} = 0$.

Now, if rack switch r is to be "used", the edge switch e connected to this rack switch needs to be "used." That is,
$u_e = 1$ if $v_r = 1$;
$u_e = 0$ if $v_r = 0$.

Thus, the following constraint is defined:

$$u_e \geq v_r, e \in E, r \in R_e \quad (3.2)$$

This constraint ensures condition 1 is satisfied, and condition 2 is satisfied at optimality.

The objective function of the MIP1 formulation is to minimize the total cost of "using" rack and edge switches, and is defined as follows $$\text{Min} \sum_{e \in E} CE_e u_e + \sum_{r \in R} CR_r v_r \qquad (0)$$

In summary, the formulation of the MIP1 model is $$\text{Min} \sum_{e \in E} CE_e u_e + \sum_{r \in R} CR_r v_r \qquad (0)$$

subject to:

$$\sum_{r \in R} xr_{lr} = N_1, l \in L \qquad (1)$$

$$xr_{l1r} + xr_{l2r} + xr_{l3r} \leq |FSR_{l1r} \cup FSR_{l2r} \cup FSR_{l3r}|$$
$$xr_{l1r} + xr_{l2r} \leq |FSR_{l1r} \cup FSR_{l2r}|$$
$$xr_{l1r} + xr_{l3r} \leq |FSR_{l1r} \cup FSR_{l3r}|$$
$$xr_{l2r} + xr_{l3r} \leq |FSR_{l2r} \cup FSR_{l3r}|$$
$$0 \leq xr_{l1r} \leq |FSR_{l1r}|, 0 \leq xr_{l2r} \leq |FSR_{l2r}|, 0 \leq xr_{l3r} \leq |FSR_{l3r}|$$

$$N_l v_r \geq xr_{lr}, FSR_{lr} \neq \varnothing \qquad (3.1)$$

$$u_e \geq v_r, e \in E, r \in R_e \qquad (3.2)$$
$$u_e, v_r \in \{0, 1\}, e \in E, r \in R$$

$$xr_{ls} \geq 0, l, r \in L \times R, \text{ and } \sum_{s \in SR_r} F_{ls} \geq 1$$

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of application architectures and has been found to be particularly applicable and beneficial in web service architectures. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for allocating resources to a plurality of applications, wherein the resources include a plurality of servers and at least one of the applications uses a tiered arrangement of servers, comprising:

gathering instrumentation data for work requests processed by the applications;

determining an associated workload level for work requests processed by the applications;

determining for each application a first application resource requirement as a function of the workload levels and a service level metric associated with the application;

representing each server as a processor-sharing queue having at least one critical resource;

determining respective average response times of each of the tiers, each respective average response time being a function of a number servers in the tier, an arrival rate of work requests, and an average utilization rate of the critical resource;

determining a total average response time as a sum of the respective average response times of each of the tiers;

determining a minimum total number of servers required in each tier for the total average response time of the application to satisfy the service level metric;

determining for each application an assigned subset of resources as a function of the first application resource requirement, wherein the function minimizes communication delays between resources, and satisfies a bandwidth capacity requirement of the application; and automatically reconfiguring the resources consistent with the assigned subset of resources for each application.

2. The method of claim 1, further comprising:

classifying the work requests by type of requester and type of work;

determining an associated requester-load level for each type of requester;

determining an associated workload level for each type of work; and adjusting a load balancing policy as a function of the workload levels and requester-load level, wherein work requests are assigned to the resources according to the load balancing policy.

3. The method of claim 1, wherein the step of determining an assigned subset of resources comprises assigning resources to tiers by a function that satisfies the resource requirements associated with each tier and minimizes communication delay between servers.

4. The method of claim 3, wherein the function is a mixed-integer programming function.

5. The method of claim 3, wherein the step of determining an assigned subset of resources comprises:

determining an initial assignment of the subset of resources using a first mixed-integer programming function;

determining a feasible assignment of the subset of resources from the initial assignment using a non-linear programming function; and determining a final assignment of the subset of resources from the feasible assignment using a second mixed-integer programming function.

6. A processor-implemented method for allocating resources to a plurality of applications, wherein the resources include a plurality of servers and at least one of the applications uses a tiered arrangement of servers, comprising:

storing work-request identifier data when a work request is initiated;

determining an identity of a completed work request from the work-request identifier data when a work request is complete and storing instrumentation data for identified work requests processed by the applications;

classifying the work requests by type of requester and type of work;

determining an associated requester-load level for each type of requester;

determining an associated workload level for each type of work for work requests processed by the applications;

adjusting a load balancing policy as a function of the workload levels and requester-load level, wherein work requests are assigned to the resources according to the load balancing policy;

generating for each application a first application resource requirement as a function of the workload levels and a service level metric associated with the application;

representing each server as a processor-sharing queue having at least one critical resource;

determining respective average response times of each of the tiers, each respective average response time being a function of a number servers in the tier, an arrival rate of work requests, and an average utilization rate of the critical resource;

determining a total average response time as a sum of the respective average response times of each of the tiers;

determining a minimum total number of servers required in each tier for the total average response time of the application to satisfy the service level metric;

determining for each application an assigned subset of resources as a function of the first application resource requirement, wherein the function minimizes communication delays between resources, and satisfies a bandwidth capacity requirement of the application; and automatically reconfiguring the resources consistent with the assigned subset of resources for each application.

7. The method of claim 6, wherein the step of determining an assigned subset of resources comprises assigning resources to tiers by a function that satisfies the resource requirements associated with each tier and minimizes communication delay between servers.

8. The method of claim 7, wherein the function is a mixed-integer programming function.

9. The method of claim 7, wherein the step of determining an assigned subset of resources comprises:

determining an initial assignment of the subset of resources using a first mixed-integer programming function;

determining a feasible assignment of the subset of resources from the initial assignment using a non-linear programming function; and determining a final assignment of the subset of resources from the feasible assignment using a second mixed-integer programming function.

10. An apparatus for allocating resources to a plurality of applications, wherein the resources include a plurality of servers and at least one of the applications uses a tiered arrangement of servers, comprising:

means for gathering instrumentation data for work requests processed by the applications;

means for determining an associated workload level for work requests processed by the applications;

means for generating for each application a first application resource requirement as a function of the workload levels and a service level metric associated with the application;

means for representing each server as a processor-sharing queue having at least one critical resource;

means for determining respective average response times of each of the tiers, each respective average response time being a function of a number servers in the tier, an arrival rate of work requests, and an average utilization rate of the critical resource;

means for determining a total average response time as a sum of the respective average response times of each of the tiers;

means for determining a minimum total number of servers required in each tier for the total average response time of the application to satisfy the service level metric;

means for determining for each application an assigned subset of resources as a function of the first application resource requirement, wherein the function minimizes communication delays between resources, and satisfies a bandwidth capacity requirement of the application; and means for automatically reconfiguring the resources consistent with the assigned subset of resources for each application.

11. The apparatus of claim 10, further comprising:

means for classifying the work requests by type of requester and type of work;

means for determining an associated requester-load level for each type of requester;

means for determining an associated workload level for each type of work; and means for adjusting a load balancing policy as a function of the workload levels and requester-load level, wherein work requests are assigned to the resources according to the load balancing policy.

12. The apparatus of claim 10, further comprising:

means for storing work-request identifier data when a work request is initiated; and means for determining an identity of a completed work request from the work-request identifier data when a work request is complete and storing instrumentation data for identified work requests processed by the applications.

13. An article of manufacture for allocating resources to a plurality of applications, wherein the resources include a plurality of servers and at least one of the applications uses a tiered arrangement of servers, comprising:

a computer-readable medium configured with instructions for causing a processor-based system to perform the steps of, gathering instrumentation data for work requests processed by the applications;

determining an associated workload level for work requests processed by the applications;

generating for each application a first application resource requirement as a function of the workload levels and a service level metric associated with the application;

representing each server as a processor-sharing queue having at least one critical resource;

determining respective average response times of each of the tiers, each respective average response time being a function of a number servers in the tier, an arrival rate of work requests, and an average utilization rate of the critical resource;

determining a total average response time as a sum of the respective average response times of each of the tiers;

determining a minimum total number of servers required in each tier for the total average response time of the application to satisfy the service level metric;

determining for each application an assigned subset of resources as a function of the first application resource requirement, wherein the function minimizes communication delays between resources, and satisfies a bandwidth capacity requirement of the application; and automatically reconfiguring the resources consistent with the assigned subset of resources for each application.

14. The article of manufacture of claim 13, wherein the computer-readable medium is further configured with instructions for causing a processor-based system to perform the steps of:

classifying the work requests by type of requester and type of work;

determining an associated requester-load level for each type of requester;

determining an associated workload level for each type of work; and adjusting a load balancing policy as a function of the workload levels and requester-load level, wherein work requests are assigned to the resources the according to the load balancing policy.

15. The article of manufacture of claim 13, wherein the computer-readable medium is further configured with instructions for causing a processor-based system to, in determining an assigned subset of resources, perform the step of assigning resources to tiers by a function that satisfies the resource requirements associated with each tier and minimizes communication delay between servers.

16. The article of manufacture of claim 15, wherein the function is a mixed-integer programming function.

17. The article of manufacture of claim 15, wherein the computer-readable medium is further configured with instructions for causing a processor-based system to, in determining an assigned subset of resources, perform the steps of:

determining an initial assignment of the subset of resources using a first mixed integer programming function;

determining a feasible assignment of the subset of resources from the initial assignment using a non-linear programming function; and determining a final assignment of the subset of resources from the feasible assignment using a second mixed-integer programming function.

18. An article of manufacture for allocating resources to a plurality of applications, wherein the resources include a plurality of servers and at least one of the applications uses a tiered arrangement of servers, comprising:

a computer-readable medium configured with instructions for causing a processor-based system to perform the steps of, storing work-request identifier data when a work request is initiated;

determining an identity of a completed work request from the work-request identifier data when a work request is complete and storing instrumentation data for identified work requests processed by the applications;

classifying the work requests by type of requester and type of work;

determining an associated requester-load level for each type of requester;

determining an associated workload level for each type of work for work requests processed by the applications;

adjusting a load balancing policy as a function of the workload levels and requester-load level, wherein work requests are assigned to the resources according to the load balancing policy;

generating for each application a first application resource requirement as a function of the workload levels and a service level metric associated with the application;

representing each server as a processor-sharing queue having at least one critical resource;

determining respective average response times of each of the tiers, each respective average response time being a function of a number servers in the tier, an arrival rate of work requests, and an average utilization rate of the critical resource;

determining a total average response time as a sum of the respective average response times of each of the tiers;

determining a minimum total number of servers required in each tier for the total average response time of the application to satisfy the service level metric;

determining for each application an assigned subset of resources as a function of the first application resource requirement, wherein the function minimizes communication delays between resources, and satisfies a bandwidth capacity requirement of the application; and automatically reconfiguring the resources consistent with the assigned subset of resources for each application.

19. The article of manufacture of claim 18, wherein the computer-readable medium is further configured with instructions for causing a processor-based system to, in determining an assigned subset of resources, perform the step of assigning resources to tiers by a function that satisfies the resource requirements associated with each tier and minimizes communication delay between servers.

20. The article of manufacture of claim 19, wherein the function is a mixed-integer programming function.

21. The article of manufacture of claim 19, wherein the computer-readable medium is further configured with instructions for causing a processor-based system to, in determining an assigned subset of resources, perform the steps of:

determining an initial assignment of the subset of resources using a first mixed-integer programming function;

determining a feasible assignment of the subset of resources from the initial assignment using a non-linear programming function; and determining a final assignment of the subset of resources from the feasible assignment using a second mixed-integer programming function.

* * * * *

UNITED STATES PATENT AND TRADEMARK OFFICE
CERTIFICATE OF CORRECTION

PATENT NO. : 7,146,353 B2  
APPLICATION NO. : 10/624318  
DATED : December 5, 2006  
INVENTOR(S) : Pankaj K. Garg et al.

Page 1 of 1

It is certified that error appears in the above-identified patent and that said Letters Patent is hereby corrected as shown below:

In column 17, line 39, delete "$F^M>0$," and insert -- $F^M \geq 0$, --, therefor.

Signed and Sealed this

Twenty-seventh Day of January, 2009

JOHN DOLL  
*Acting Director of the United States Patent and Trademark Office*